(12) United States Patent
Newton

(10) Patent No.: US 11,009,858 B2
(45) Date of Patent: May 18, 2021

(54) INDUSTRIAL AUTOMATION NETWORK EVALUATION SYSTEM AND METHOD

(71) Applicant: ROCKWELL AUTOMATION TECHNOLOGIES, INC., Mayfield Heights, OH (US)

(72) Inventor: Joshua E. Newton, Bellevue, WA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 141 days.

(21) Appl. No.: 16/146,003

(22) Filed: Sep. 28, 2018

(65) Prior Publication Data
US 2020/0103865 A1    Apr. 2, 2020

(51) Int. Cl.
| | |
|---|---|
| G06F 15/177 | (2006.01) |
| G06F 9/24 | (2006.01) |
| G05B 19/418 | (2006.01) |
| G05B 23/02 | (2006.01) |
| H04L 12/24 | (2006.01) |

(52) U.S. Cl.
CPC ..... G05B 19/4185 (2013.01); G05B 23/0216 (2013.01); H04L 41/0686 (2013.01); H04L 41/0853 (2013.01); H04L 41/0883 (2013.01); H04L 41/12 (2013.01)

(58) Field of Classification Search
CPC ............ G05B 19/4185; G05B 23/0216; G05B 19/0426; G05B 2219/25067; H04L 41/12; H04L 41/0883; H04L 41/0853; H04L 41/0686
See application file for complete search history.

(56) References Cited

U.S. PATENT DOCUMENTS

2017/0227944 A1*  8/2017  Goli ..................... G06F 3/0482
2018/0183684 A1*  6/2018  Jacobson ............ H04L 12/2803

FOREIGN PATENT DOCUMENTS

EP    3206097 A1    8/2017

OTHER PUBLICATIONS

Extended European Search Report for EP Application No. 19199159.5-1205 dated Feb. 18, 2020.
Breitbart, Yuri, Topology Discovery in Heterogeneous IP Networks: The NetInventory System, Jun. 1, 2004, pp. 101-414, vol. 12, No. 3.

* cited by examiner

Primary Examiner — Xuxing Chen
(74) Attorney, Agent, or Firm — Fletcher Yoder, P.C.

(57) ABSTRACT

Automation and network components of an industrial automation network are discovered and evaluated using a configured tool that can access the components and determine their interconnection and configuration. The equipment on the network may include automation and monitoring devices, such as controllers, drives, switchgear, and so forth, as well as network components such as servers, routers, industrial managed switches, and so forth. The configuration may be graphically mapped for an operator, and known issues or deficiencies in the detected configuration may be used to evaluate potential problems that can be addressed. The access and evaluation can be done during real-time operation of the system without perturbing its normal automation functions.

20 Claims, 14 Drawing Sheets

INDUSTRIAL AUTOMATION NETWORK EVALUATION SYSTEM AND METHOD

BACKGROUND

Embodiments of the present disclosure relate to the field of automation control, and more particularly to discovery and evaluation of network components and their configuration, and presentation of the configuration to a user for evaluation.

Designing, installing, operating, and maintaining automation control systems for processes can be complex and expensive operations. Such systems may include a wide array of different automation and monitoring devices that interact to perform highly complex automation functions, such as manufacturing, process control, assembly, material handling, packaging, and so forth. In modern systems, the components are interconnected by networks, and large amounts of data are generated and exchanged to properly perform the desired automated processes, and to collect feedback and performance data used to monitor and control the related machinery, and to detect any issues or needs as they arise.

While individual components, both for control/monitoring and for networking are configured, programmed, interconnected, and commissioned initially in such environments, in many cases their configuration may not be coordinated or optimized. Moreover, changes or additions are commonly made to the networks and components over time, so that no really reliable model of the network and component configuration is available in case of need. In practice, it is common to assign human analysts to access the network and components and to laboriously determine the components present, and how they are networked and configured. This can be a very time consuming and expensive process. Moreover, because such systems are ordinarily functioning and their operation should not be perturbed, the manual access and evaluation tasks are further complicated by the need to respect the ongoing operation of the systems being evaluated. Further, the field of industrial automation is unique in its requirements for production and production control insomuch as physical objects are commonly being manipulated, many at high speed, and network evaluation should ideally happen in the background, and with the data and communications remaining secure and isolated as dictated by the automated process and enterprise.

There is a pressing need in the field of industrial automation for improved techniques that can allow access to industrial networks, and that can, during normal operation of the equipment, evaluate network topologies, and determine component configurations, and then present the resulting determinations to operators for further review and action.

BRIEF DESCRIPTION

The present disclosure relates to systems and methods designed to respond to such needs. In accordance with a first aspect of the disclosure, a system comprises an industrial automation network hardware interface that, in operation, establishes connections with industrial automation machines connected over an industrial automation network, an evaluation module comprising executable code stored in an evaluation hardware module that, in cooperation, determines configuration of the industrial automation machines and the industrial automation network automatically and without user interaction, and a user interface that, in operation, presents the configuration graphically to a user.

In accordance with another aspect of the disclosure, a system comprises an industrial automation network hardware interface that, in operation, establishes connections with industrial automation machines connected over an industrial automation network, an evaluation module comprising executable code stored in an evaluation hardware module that, in cooperation, determines configuration of the industrial automation machines and the industrial automation network automatically and without user interaction, and a user interface that, in operation, presents the configuration graphically to a user. The industrial automation network comprises a plurality of industrial managed switches and a plurality of network levels. The evaluation module and the user interface cooperate to determine configuration of the industrial managed switches and to identify and display representations of the networked industrial automation machines at the plurality of network levels.

In accordance with a further aspect of the disclosure, a method comprises establishing, via an industrial automation network hardware interface, connections with industrial automation machines connected over an industrial automation network, evaluating, via an evaluation module comprising executable code stored in an evaluation hardware module, configuration of the industrial automation machines and the industrial automation network automatically and without user interaction, and configuring and graphically displaying to a user the configuration, via a user interface.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Present embodiments are directed to systems and methods for evaluating, understanding, discovering, mapping, configuring, and carrying on similar industrial automation network operations for networked industrial automation machines. Present embodiments may function within a graphics-based environment. Network discovery and analysis in accordance with present embodiments determines device and network configurations and physical and programmed interoperability, essentially without user or operator intervention, and permits graphical representations that inform the user of the configurations, and any issues or deficiencies that may be automatically discovered, and all during operation of the evaluated automation system (that is, while controlling and/or monitoring an ongoing industrial process, such as manufacturing, assembly, or the like).

Figure 1:
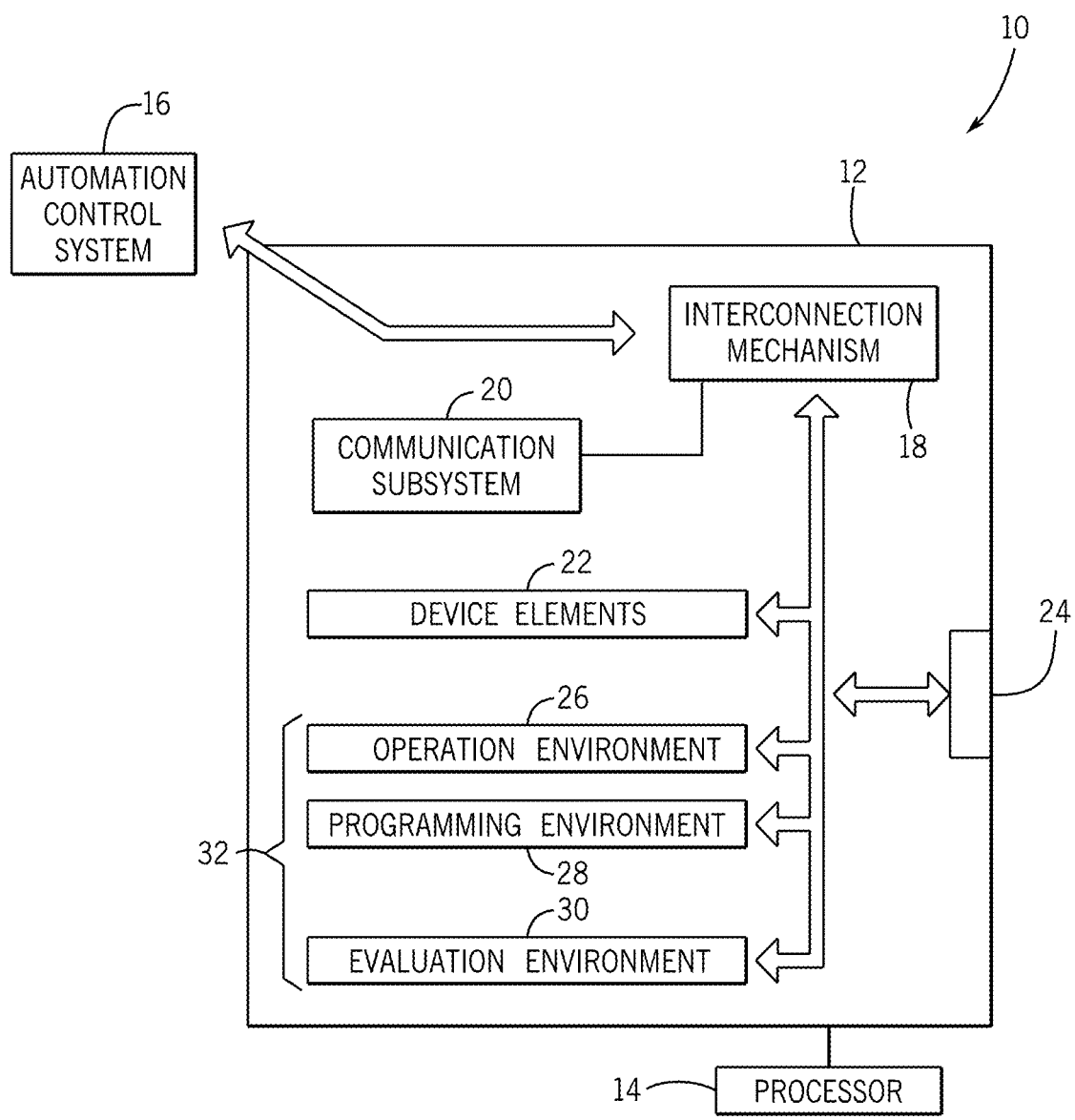
FIG. 1 is a diagrammatical representation of a control, monitoring, and evaluation system in accordance with an embodiment of the present disclosure.

Present embodiments may facilitate discovery and configuration determination of a wide variety of automation control devices such as automation controllers, (e.g., programmable logic controllers), input/output modules, backplanes, bridge modules (e.g., an Ethernet bridge module), motor drives, motor starters, analog modules, digital modules, gateways, switches, servers, and so forth. It should be noted that configuration evaluation in accordance with present embodiments may include discovery of communication (e.g., Ethernet or proprietary network communications) between the automation components or machines modules in addition to evaluation of internal operational characteristics (particularly network settings) for individual components. Of particular interest in some applications will be the role and configuration of industrial managed switches in the automation system, though many other components and machines may be discovered and their configuration determined and presented FIG. 1 is a diagrammatical representation of a control, monitoring, and network evaluation system 10 in accordance with an embodiment of the present disclosure. The system 10 may include hardware components, such a modular hardware embodying circuitry, one or more processors, memory, network interface circuits, server circuitry, and so forth. In some embodiments, the system 10 may be designed and packaged to fit in a lot or location in an enclosure (not shown) so as to facilitate connection to an industrial automation network (e.g., via cabling or a shared backplane). In other embodiments, the system may be provided in a workstation that could be located in a factory environment (e.g., close to production or handling equipment of the automated process), or remotely (e.g., in a controlled office environment, management locations, etc.). Programming instructions and routines for discovering and evaluating the network and connected automation machines may be stored on one or more computer readable media (e.g., memory) 12 that are non-transitory (i.e., not a transitory, propagating signal) and implemented by one or more processors 14 in a unified or distributed system. The system 10 facilitates evaluating one or more automation control environments that define or represent an automation control system 16 by utilizing an interconnection mechanism 18, which inherently supports dynamic discovery and configuration discovery of associated devices. This dynamic discovery and configuration discovery ability facilitates efficient provision of network mapping and evaluation for configurable automation components that can be automatically evaluated in accordance with present embodiments.

The interconnection mechanism 18 may be a module-based feature that includes a protocol or protocols configured for use as one or more interfaces between modules or devices. For example, in the illustrated embodiment, the interconnection mechanism 18 includes a communication subsystem 20, which may include a library of specifications (e.g., routines) for communication with a variety of different devices and associated behavioral characteristics. Thus, the interconnection mechanism 18 enables communication between actual automation control devices in the automation control system 16. Specifically, this may include communication between device elements 22 of the system 10 and actual physical devices of the automation control system 16, including when the physical devices are operational in controlling and/or monitoring of the automated process. In accordance with some embodiments, the communication subsystem 20 may be described as including an application programming interface (API).

The device elements 22 and programming routines used to discover and evaluate the network and component configurations may each be provided as stand-alone code that can be individually programmed, pre-written for use, as in a library, customized in their function and appearance in screens, and interconnected to provide information to a user as well as control and monitoring functions. The device elements 22 may include any generally similar components or self-sufficient programs that can be run as quasi-independent elements, sometimes referred to as objects. The device elements 22 generally include four features: properties, methods, connections (or connection points) and communications interfaces. Properties, in this context, may include attributes that can be adjusted, such as to define representation (e.g., an image) of the element in a screen view, as well as its location on the screen, and so forth. In this context, a method is an executable function (sometimes referred to herein as the elements "functionality" or "state engine"), and defines an operation performed by execution of the element. A connection, in this context, is a link between the device elements 22, and can be used to cause data (read from a memory or written to a memory) to be sent between device elements 22 and to system components.

As noted above, the system 10 also facilitates evaluation of physical automation devices. The evaluation may include an evaluation module, which may be both physical (e.g., hardware and circuitry) and software (e.g., code) implemented as modules of the system 10. The evaluation model may be implemented, run, launched or function when prompted by the system or by a user or operator, and may be resident in the overall automation environment, or may be temporarily connected to the automation network for evaluation of configuration and any discovered problems, or it may be connected to the automation environment remotely (e.g., as a service by an outside provider). It should be noted that the interconnection mechanism 18 may communicate (e.g., via the communication subsystem 20) with both the network components (e.g., servers, routers, managed switches, gateways, etc.) and the automation components (e.g., automation controllers, motor drives, input/output modules, networked power components, etc.). Because the discovery and evaluation functions advantageously determine interconnections and configurations of the actual operating or working automation system, its connection to the automation network and its implementation may be carried out while actual control and/or monitoring is taking place as normal, without interrupting or perturbing any aspect of the automated process.

The system 10 includes interrelated software environments that can reside on a single system (e.g., computer) or multiple systems. In some implementations, this can be done without requiring proprietary hardware. The system 10 may include a user interface 24 configured to cooperate with inputs for accepting operator input data. Such input may be utilized for launching the evaluation tools, adding to or designating component and network data, annotating evaluation data, downloading or uploading data, accessing data for reports, and so forth. Specifically, for example, aspects of one or more of the software environments of the system 10 may be configured or modified based on user inputs. Further, the interface 24 may be configured to receive input data from other external sources, such as hardware or software of the automation system, component providers, component documentation, enterprise data repositories, and so forth.

In the illustrated embodiment, the elements of the system 10 include an operation environment 26, a programming environment 28, and an evaluation environment 30. These various environments 32 may be separate or interwoven, and provide operational, design, and evaluation functionalities. The environments 32 may cooperatively define a system based on user-input, with fully automated or assisted network component configuration discovery and evaluation. While certain aspects of the environments 32 may overlap to provide certain operational efficiencies and necessary coordination, certain aspects may be kept specifically separate. For example, an evaluation system or model within the evaluation environment 30 may be prevented from sending operational data to the corresponding physical automation control system 16. However, the operation environment 26 may be fully capable of communicating with the automation control system 16 to implement control actions and receive feedback.

The operation of the system enables an operator (e.g., a human user) to interact with an automated process, its control/monitoring hardware, and network components such as an active automation control system during run-time (e.g., during use of the interface, typically during interaction with or observance of a process in operation). The communications subsystem 20 is adapted to interconnect the device elements 22 and to cooperate with physical devices. In practice, the communications subsystem 20 may be thought of as including the connections of the device elements 22. However, it may include a range of software, hardware and firmware that send data to and receive data from external circuits, such as automation controllers, input/output devices, computers, networks, sensors, actuators, and so forth. Further, the communication subsystem 20 may include features that manage behavior associated with the device elements 22. For example, the communication subsystem 20 may change modes of operation, take snap shots of system feature operations, "ping" or otherwise contact control/monitoring components, determine or imply configurations, test connections and configurations, determine component identifications, manufacturers, designations, and so forth.

Further, in accordance with present embodiments, the communication subsystem 20 may provide access to the operation environment 26 and the evaluation environment 30 via remote provision of the programming environment 28, such as in a conventional browser. The communication subsystem 20 allows an operator or designer to interact with and change aspects of the operation environment 26 and/or the evaluation environment 30, such as via a graphical user interface on a remote programming terminal by serving the programming environment 28, evaluation environment 30, or aspects thereof to the programming terminal from the graphical user interface. For example, a graphical user interface (e.g., human-machine interface) coupled to a laptop via a network may provide a user with evaluation determinations and configuration capabilities by serving up a specific programming environment 28 to the laptop via the network.

The evaluation environment 30 may provide an evaluation subsystem that implements discovery and configuration evaluation, including determination of potential problems, security issues, deficiencies, non-compliant aspects, and so forth or any component or of the network. For example, the evaluation environment 30 may evaluate an implemented automation control system based on known aspects of the hardware (e.g., how it should be configured, known configuration errors or vulnerabilities, etc.) set forth in the executable code implemented by the system. The evaluation environment 30 may be generated based on modules that can be programmed and updated as additional issues, tests, or problems are identified, along with protocols for determining whether they are present in the component configurations. Further, as noted above, the evaluation environment 30 may facilitate creation, configuration, commissioning, and/or modification of the network or any automation or network components.

Figure 2:
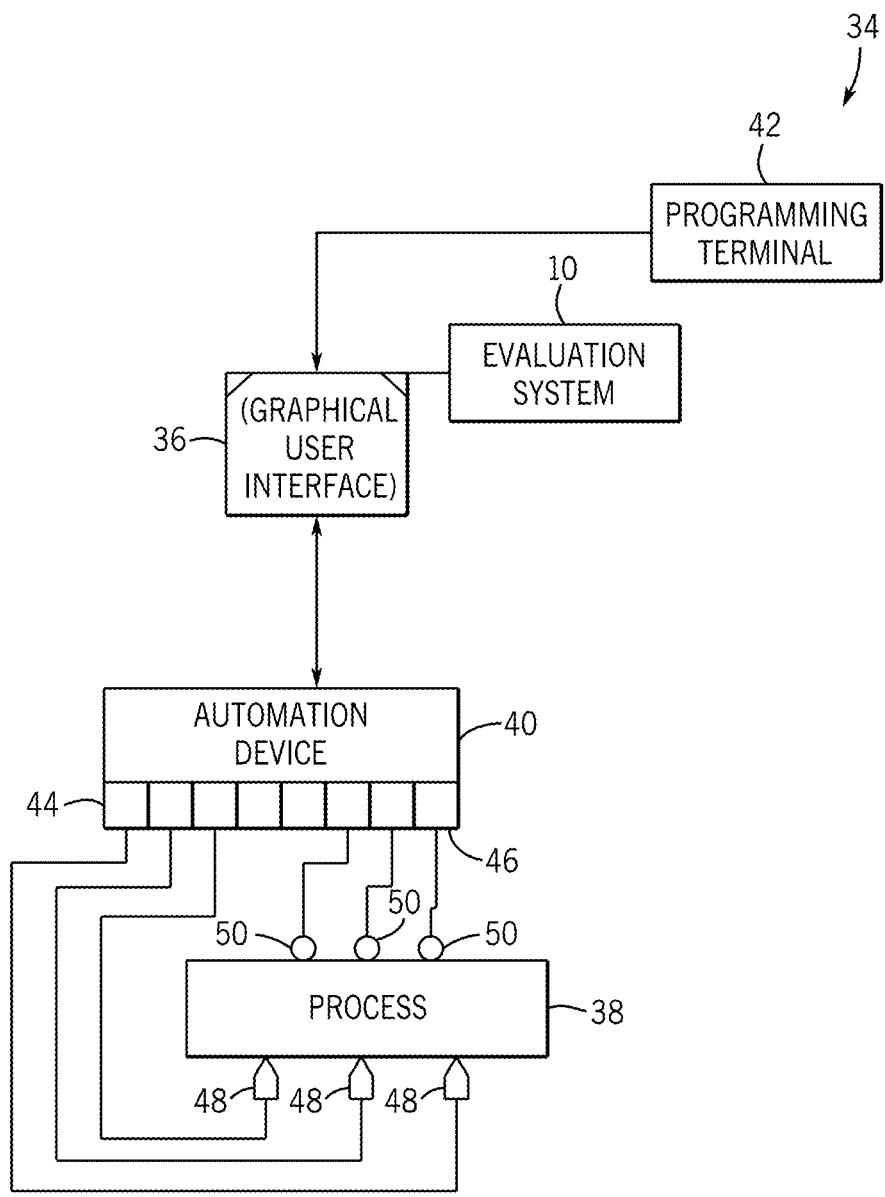
FIG. 2 is a diagrammatical representation of a control and monitoring system that is configured to implement methods described herein in accordance with an embodiment of the present disclosure.

FIG. 2 is a diagrammatical representation of an example industrial automation system 34 for the control and/or monitoring of an automated machine or set of machines (e.g., a factory, material handling system, assembly or packaging system, etc.) that is configured to implement methods described herein in accordance with an embodiment of the present disclosure. The system 34 includes an interface 36, which may take the form of or include a graphical user interface (e.g., a human-machine interface) adapted to interface with networked components and configuration equipment. The interface 34 may be resident on a computer, computing resource, or the like (e.g., a cloud infrastructure), collaborating with components of a process 38 through an automation device 40 (e.g., a remote computer, automation controller) that is configured to control and/or monitor aspects of the process 38. It should be noted that the interface 36 may be accessed and programmed via a local or remote programming terminal 42.

The interface 36 may be adapted to allow a user to interact with virtually any process. For example, the process 38 may comprise any automated industrial operation and may comprise a variety of operational components, such as electric motors, valves, actuators, sensors, or a myriad of manufacturing, processing, material handling and other applications. Further, the process 38 may comprise control and monitoring equipment for regulating process variables through automation. In the illustrated embodiment, such equipment cooperates with the automation device 40, which may include an automation controller, programmable logic controller, motor drive, switchgear, and the like, and an associated input/output (I/O) device 44. The I/O device 44 includes input/output connections 46, which may be representative physical connectors and/or associated storage registers. In other embodiments, the automation device 40 may include any number of similar automation devices that may be in communication. The illustrated process 38 comprises sensors 48 and actuators 50. The sensors 48 may comprise any number of devices adapted to provide information regarding process conditions. The actuators 50 may similarly include any number of devices (e.g., electric motors) adapted to perform a mechanical action in response to an input signal received by the actuators.

Features of the automation device 40 and the interface 36 may include functionality by which they read from or write to specific memory or registers of memory, typically in other devices. For example, a particular function may correspond to writing to or reading from a particular register of the automation device. In a simple case, for example, an object accesses a piece of data (e.g., a state of a component as determined by one of the sensors), and generates an output signal to write a value corresponding to the state of a different networked device. Collaboration between the interface and components of the process may be facilitated by the use of any suitable network strategies, network topologies, and appropriate configuration of the automation and network components.

As illustrated, the sensors 48 and actuators 50 are in communication with the automation device 40 (e.g., an automation controller and/or motor drive) and may be assigned a particular address in the automation device that is accessible by the interface 36. This assignment may initially be done automatically or manually. In other embodiments, the sensors and actuators may be in direct communication with the interface. In operation, these sensors and actuators may be receiving or generating data from process equipment that may be utilized by the system to control and operate process equipment. Indeed, the sensors and actuators may be utilized within process loops that are monitored and controlled by the automation device 40 and/or the interface 36. Such a process loop may be defined by instructions or logic (e.g., ladder logic) resident in the automation device 40 and activated based on process inputs (e.g., input from a sensor) or direct inputs (e.g., operator input received through the interface).

The operation environment 26, programming environment 28, and evaluation environment 28 may each be stored on and resident in the one or more features of the system 30. For example, each of these environments may be resident in the interface 36 of the illustrated embodiment as components of the evaluation system 10. As an example, the communication subsystem can be adapted to load the evaluation system 10 from a storage location, such as during initial manufacture or setup of the interface 36. When loaded, the stored evaluation system 10 may be adapted to create screens and locate user interface device elements in appropriate visualizations (i.e., graphical representations of system features).

The interface 36 or some other feature incorporating one of the environments 32 (operation environment 26, programming environment 28, and emulation environment 20) may be thought of as including instructions for presenting one or more screen views or visualizations, and device elements executed upon interaction with the interface 36 by reference to the screen views (e.g., pressing a button, touching a location of a screen, and the like).

As summarized below, the system 10 may service any type or topology of industrial automation network and its component, including both automation components and network components. Certain data may be known by the system based upon component identifications, manufacturers, and so forth, or some of this data may be input by users. But in general, once the system is launched to discover and determine the topology and configuration of the network and its components, little or no user interaction is required. The system may make use of one or more templates that contain data that is automatically populated upon discovery and determination of components present and their configuration. These may be used as reports for users, both for understanding the network and for making any additions or changes desired (e.g., correcting or altering configurations, correcting known problems or errors, etc.).

Moreover, while the automation and network components may range in manufacturer, type, function, and configuration, as noted above, the networks contemplated in this disclosure, and the access and evaluation techniques extend to industrial managed switches, when are becoming increasingly important in industrial automation environments. A "managed switch" is a network device that allows for control of data traffic, such as on a local area network, and particularly for prioritizing certain data. Such prioritizing may be important in industrial automation systems insomuch as certain data may be highly relevant to control and monitoring operations (unlike in other environments that merely require routing of network traffic for general purposes). Industrial managed switches will typically allow for configuration, management, and monitoring of the network and control over how data travels over the network, and what components and users have access to it. Certain industrial managed switches may allow for remote detection of issues, changes, and troubles in the network, so that operations personnel may take remedial measures. In the unique environment of industrial automation, however, the additional configuration and data generation and exchange by many application-specific devices (e.g., automation controllers, human machine interfaces, motor drives, input/output modules, etc.), and the requirements of real-time operating systems make the role of industrial managed switches even more demanding than in other environments. Examples of industrial automation switches include devices commercially available from Rockwell Automation under the commercial designation "Stratix".

Figure 3A:
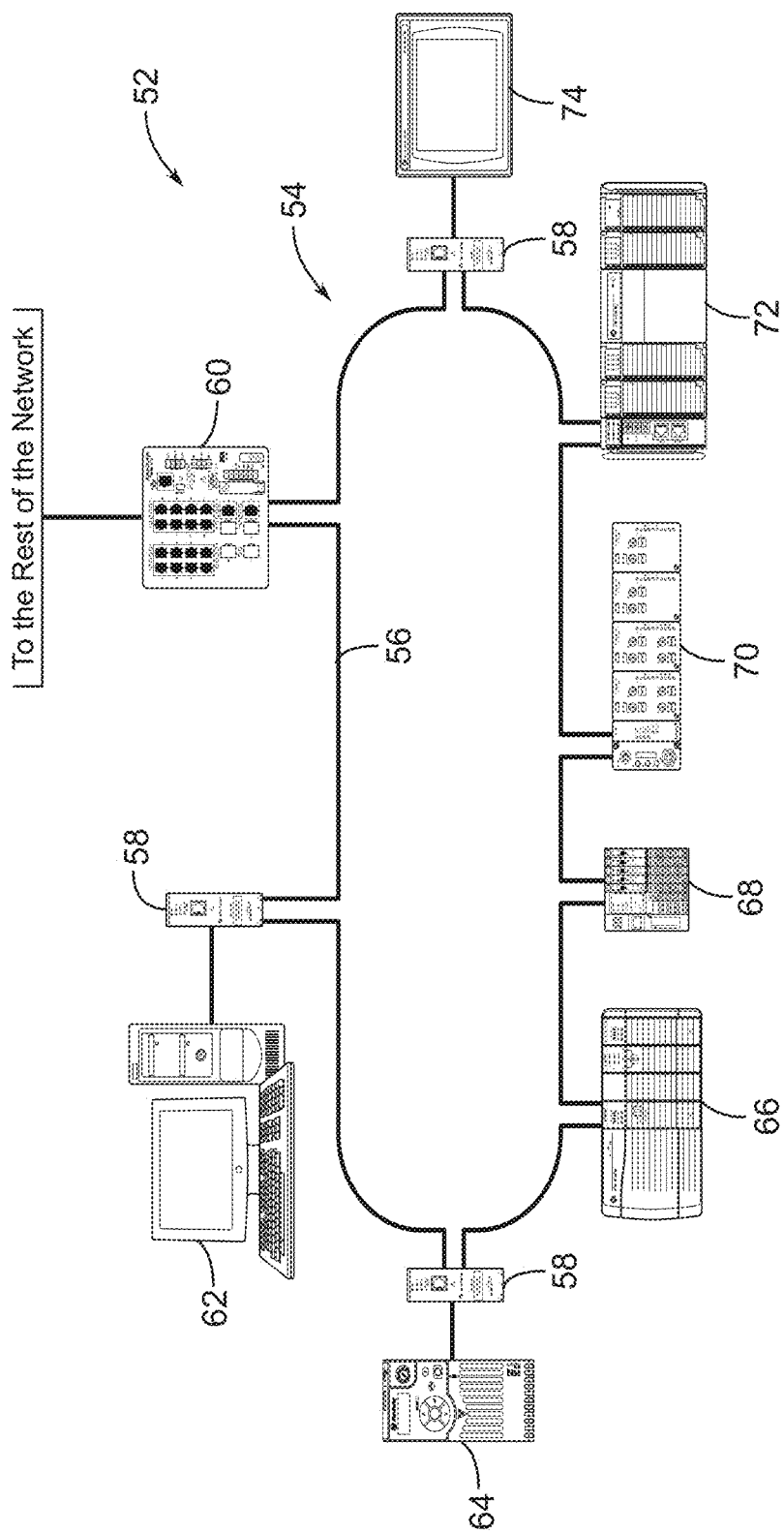
FIGS. 3A-3F are diagrams of example network topologies that may be implemented for industrial automation systems, and that can be accessed and evaluated by the disclosed techniques.

FIGS. 3A-3F are diagrams of example network topologies that may be implemented for industrial automation systems, and that can be accessed and evaluated by the disclosed techniques. As noted, any topology of network may be accessed and evaluated (and configured or designed) using the present techniques. In a presently contemplated embodiment, configurations and configuration changes are not performed directly. The system will provide configuration scripts for what configuration should be. Any changes to an industrial automation system or network will normally require approval and possibly through change management processes. In the example of FIG. 3A, the automation system 52 has an automation network 54 that forms a device-level ring 56 with automation and network devices coupled for communication around the ring. It should be mentioned that while networks and their interconnections are illustrated in the figures as "wired", any communication technology may be utilized, including wireless technologies. In the example illustrated, switches 58 (e.g., an Ethernet/IP tap) is coupled to permit communication with automation devices, while a managed switch 60 allows for communication between the components of the ring and other networks beyond the ring (e.g., other areas, other devices, remote devices, enterprise networks, etc.). Two of the switches are show as coupled to an automation controller 62, and to a motor drive 64 (which in an actual application would itself be coupled to and power an electric motor by conditioning of incoming power to a desired output power, such as to control speeds of the motor by varying the frequency of the output power). A number of devices are then shown directly coupled to the ring, including an Ethernet interface and input/output module assembly 66, and communication adapters with input/output module assemblies 68, 70, and 72. In practice, these would be coupled to actuators and/or sensor for output of commands and receipt of sensed parameters and data relevant to the automation control and monitoring functions of the application. Finally, a human machine interface (HMI) 74 is shown as coupled to another switch 58. Such HMIs may be placed on or near controlled or monitored points of the automation application to permit human operators to interact with the process or automation equipment.

Figure 3B:
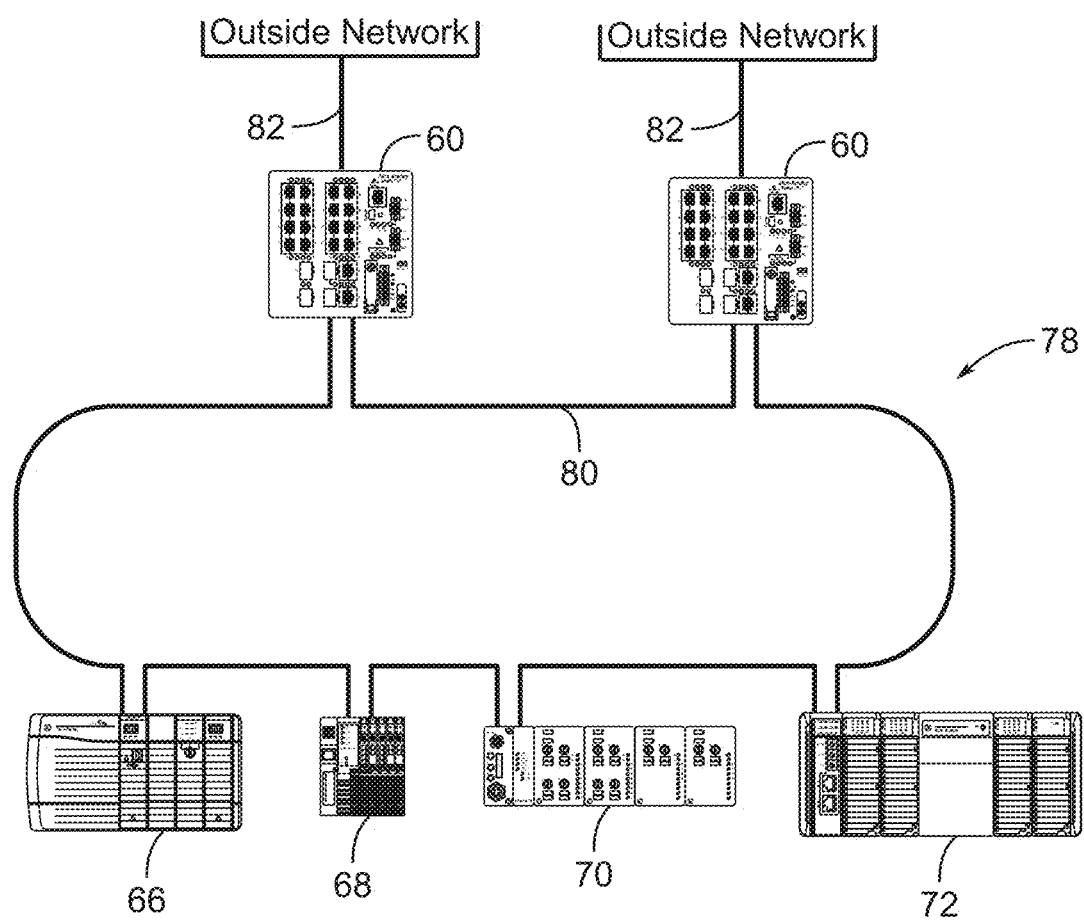
Figure 3C:
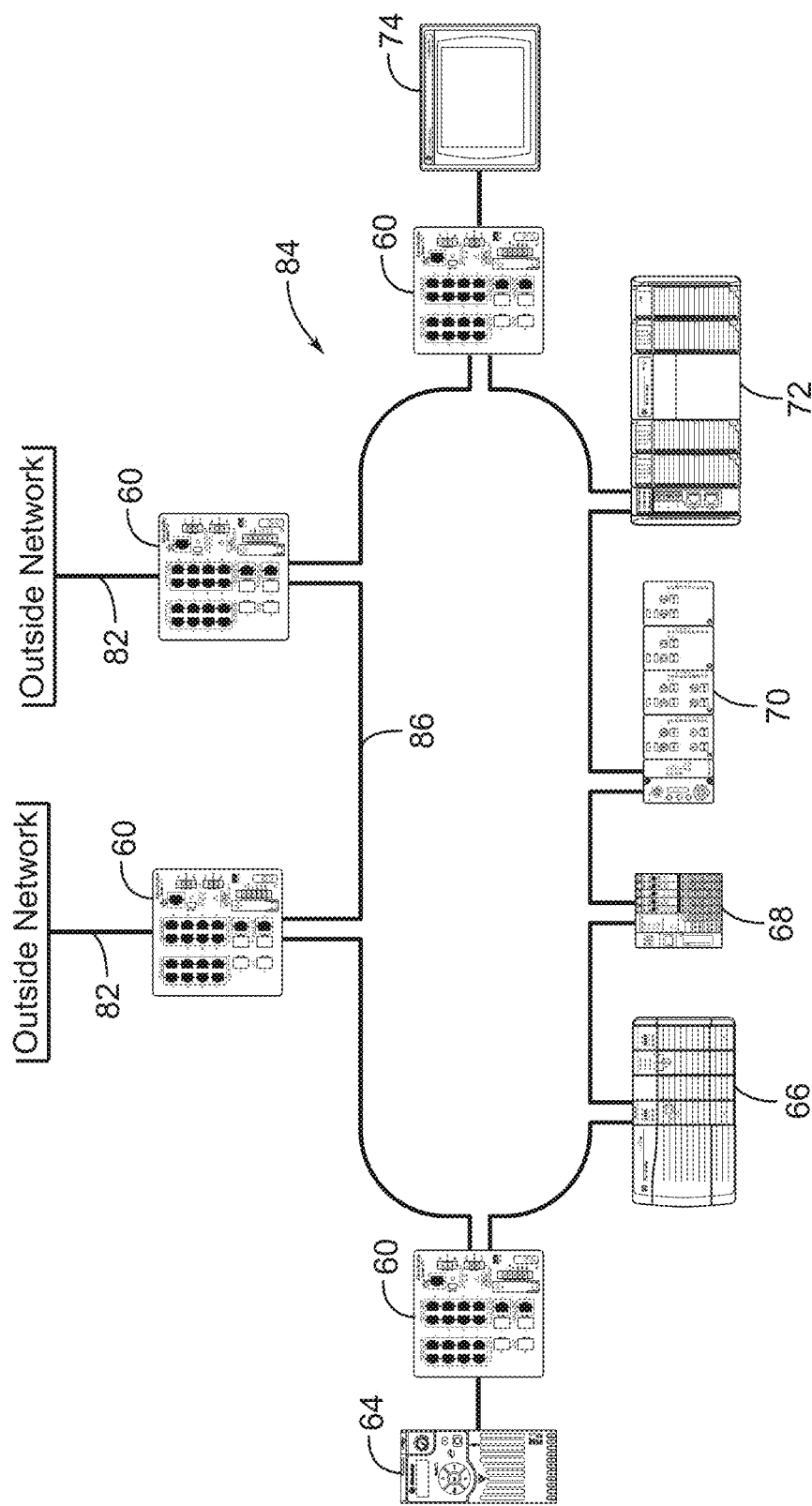
Figure 3D:
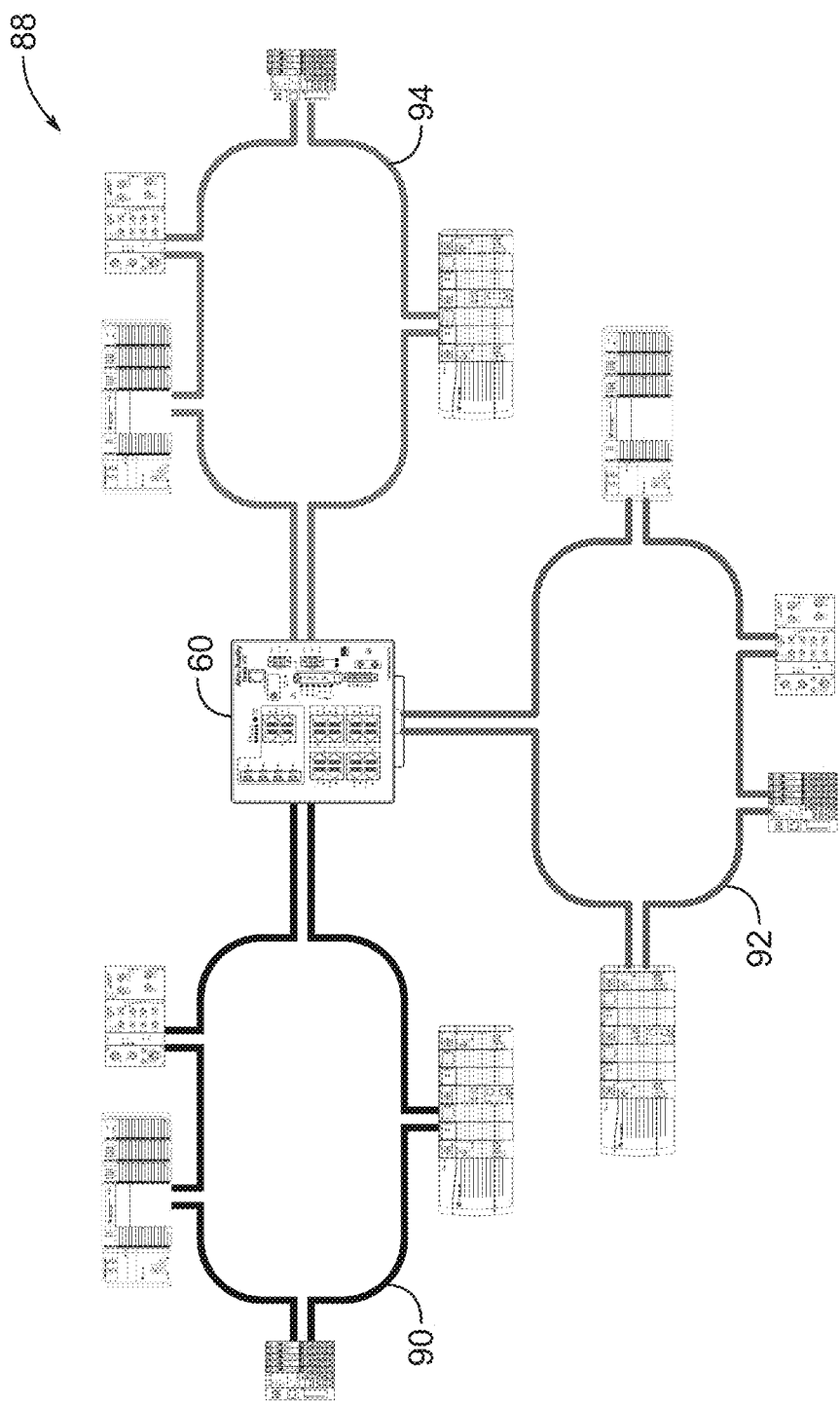
Figure 3E:
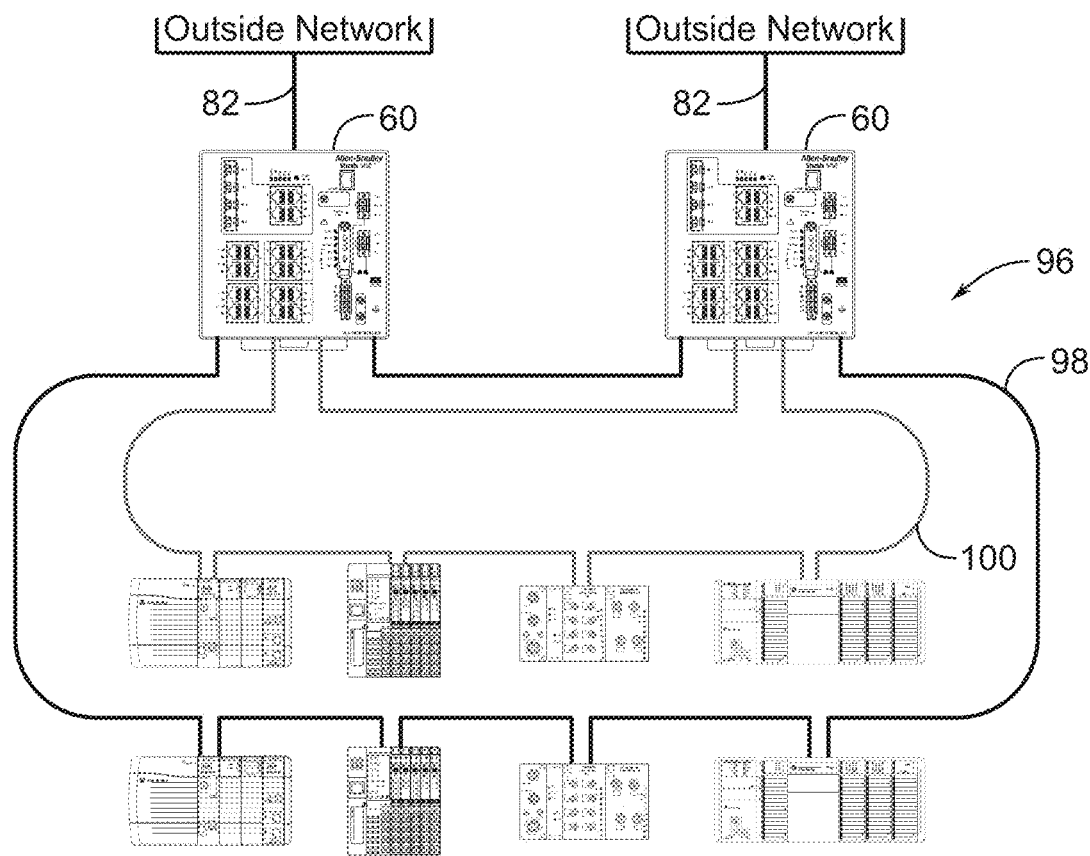
Figure 3F:
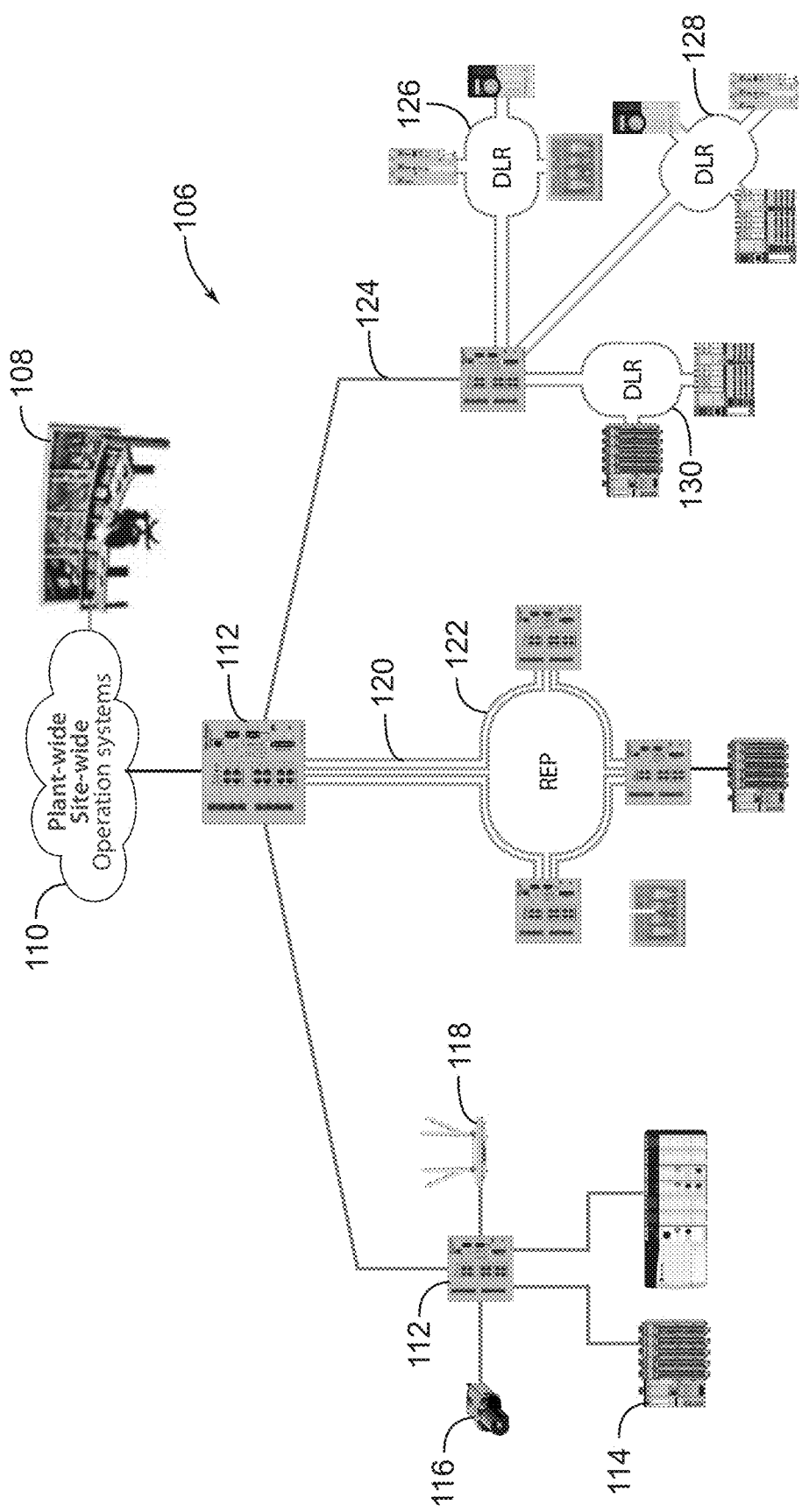

FIG. 3B shows another example network topology 78, in this case a ring supervisor with redundant gateway. Here, managed switches 60 coupled to a ring 89, around which automation devices 66, 68, 70, and 72 may be coupled. One of the switches may act as an active supervisor and active redundant gateway, while the other serves as a backup supervisor and backup redundant gateway. In the example of FIG. 3C, a topology 84 is illustrated that may be referred to as a ring node with redundant gateway. Here a ring 86 may again be coupled to switches 60 and through the switches, or directly, to automation components 64-74. In this example, the ring is coupled to an outside network through two managed switches, one of which may serve as a ring node and active redundant gateway, and the other as a ring node and backup redundant gateway. FIG. 3D shows another example topology 88 that may be referred to as a multiple ring network. Here an industrial managed switch 60 is coupled to several different rings 90, 92, and 94, which in turn may allow communication with multiple automation and network components as described above. In a further example shown in FIG. 3E, a topology 96, which may be referred to as a redundant gateway with multiple rings may include manages switches 60 as before, but with outer and inner rings 98 and 100, which may form virtual local area networks, each of which may be coupled to multiple automation and network devices, as noted above. Finally, FIG. 3F illustrates a somewhat more complex topology 106, in which a control center 108 may have various control and monitoring workstations, and that may be coupled to a plant or enterprise network 110. An industrial managed switch 112 is coupled to multiple subnetworks to permit communication and network traffic between the subnetworks (including between components of each) and the enterprise network. For example, subnetwork 114 is shown as including automation devices (here including one or more cameras or other detection components 116, and wireless transmitters/receivers 118). Subnetwork 120 is shown as having a ring architecture 122. And subnetwork 124 is shown as comprising multiple further subnetworks 126, 128, and 130, which here each comprise a device level ring architecture.

Figure 4:
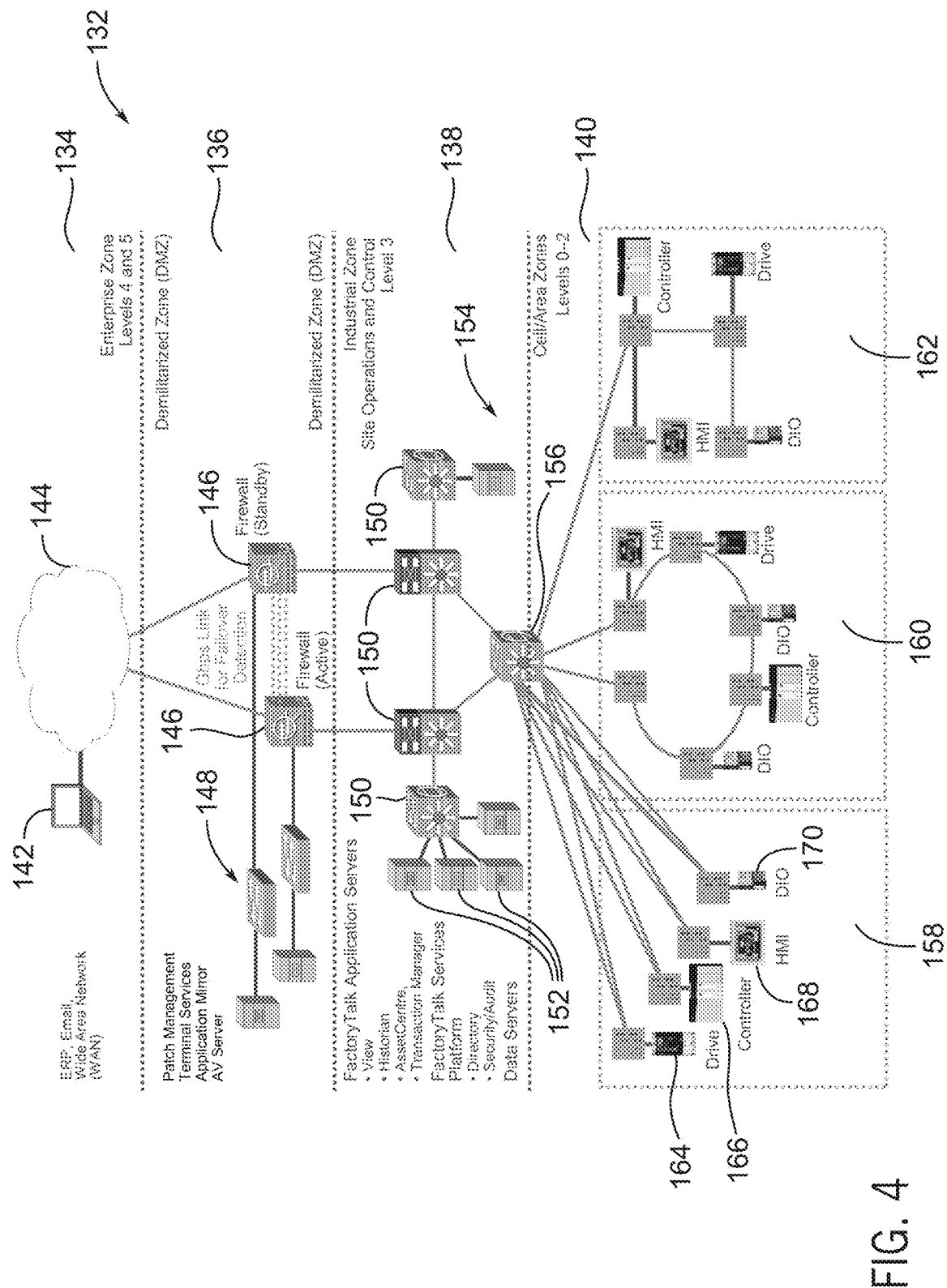
FIGS. 4 and 5 illustrate an example hierarchical network structure for a network in an industrial automation application.
Figure 5:
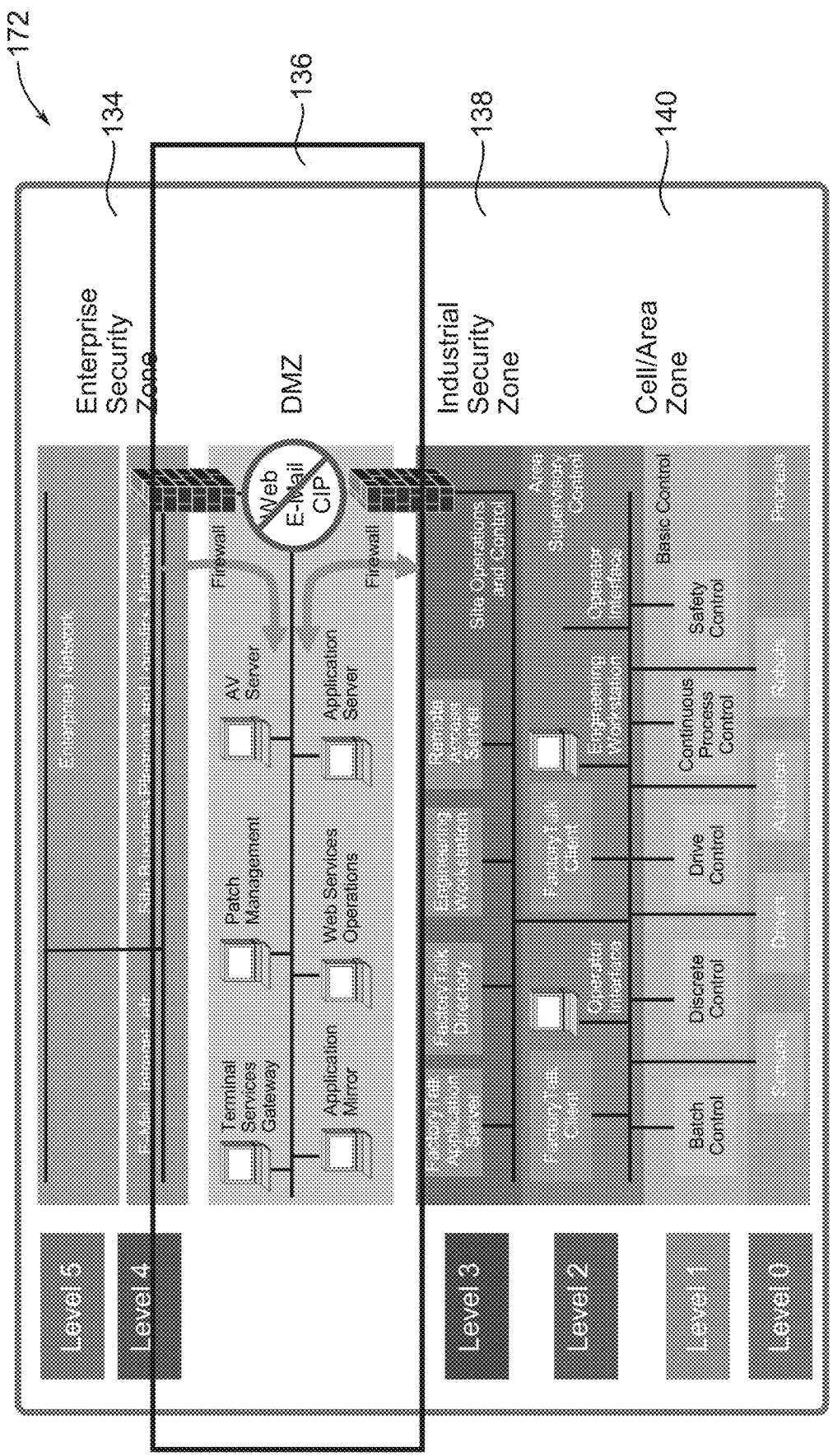

FIGS. 4 and 5 illustrate an example hierarchical network structure for a network in an industrial automation application, which itself may comprise any or all of the foregoing topologies, or other architectures as well. The network 132 here is illustrated as comprising "zones" hierarchically, including an enterprise zone 134, a "demilitarized" (DMZ) or isolation or security zone 136, an industrial zone 138, and a cell/area zone 140, which itself may comprise multiple areas or zones. The highest level zone 134 may include enterprise-level workstations 142 and a network 144 for sharing any or all data of the industrial automation application. This (or any other network here) may include data or processed supported or carried out in the "cloud" or any remote or service solution. The DMZ may include one or more firewalls 146 (e.g., an active and a standby firewall), as well as support devices (e.g., for patch management, terminal services, and so forth). The industrial zone may include managed switches 150 that allow for communication between the zones, and that, along with other devices such as servers 152, provide industrial automation application servers (e.g., view, historian, asset management, data, etc.). Finally, the cell/area zones may include one or more subnetworks coupled to one or more managed switches 156. In the illustration of FIG. 4, automation devices include motor drives 164, automation controllers 166, HMIs 168, and input/output devices 170. It should be noted that such subnetworks may themselves comprise any desired architecture, including those described above. FIG. 5 shows a logical model 172 for the network of FIG. 4.

Figure 6:
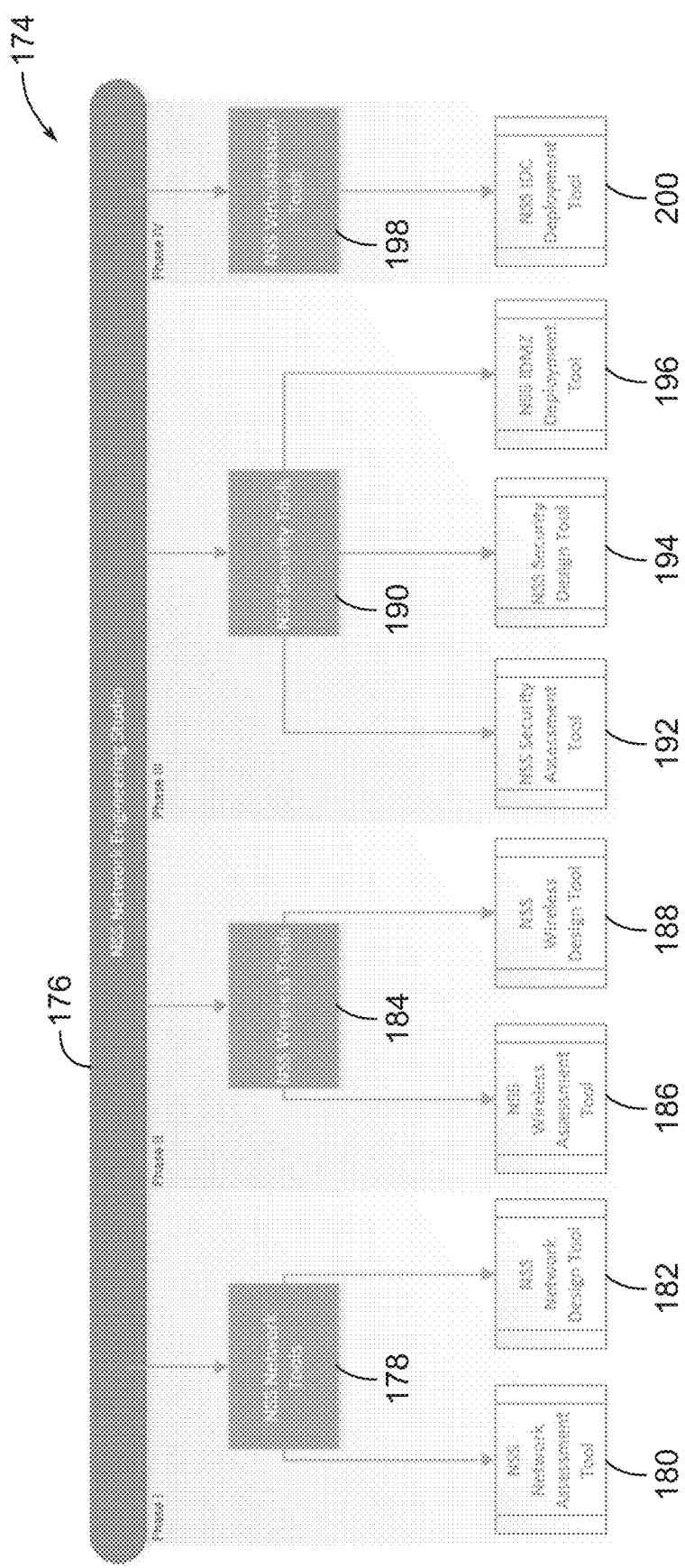
FIG. 6 is a diagrammatical representation of a structure for the analytics system.

As noted above, the system 10 will comprise one or more memories and processors that store and execute programming for accessing, discovering, and evaluating industrial automation and network components, and for determining their configuration, which can be reported to operations personnel by populating one or more templates. FIG. 6 is a diagrammatical representation of a structure 174 for the system. The system may be designed as a suite of tools or services, here illustrated as a network and security services (NSS) engineering studio 176. Again, such tools will typically be defined as programmed routines that are stored at one or more locations on non-volatile memory, and that can be executed to instantiate objects or elements that access network components, determine their configuration, diagnose any known issues or problems, process collected data, and populate templates or reports for systems operators and designers. In the illustration, the system may comprise several phases, and these may be offered as application packages, subscription services, online tools, or services of an outside service provider for the enterprise in which the automated processes are performed. It should be understood, then, that the memory and processors, workstations, network devices and connections, along with any templates, reports, and so forth, may exist and be run at any desired location or locations, both local and remote from the underlying automation system and process.

In the illustrated example, first phase include NSS network tools (e.g., systems and applications) 178 that themselves allow for network evaluation or assessment, and for network design, as indicated by reference numerals 180 and 182. The operation of these tools is described below. In another phase, NSS wireless tools 184 include again a assessment tool 186 for wireless equipment and networks, and a wireless design tool 188. In a further phase, NSS security tools 190 include a security assessment tool 192, a security design tool 194, and a DMZ deployment tool 196. Finally, a further phase may include a virtualization tool 198, such as a deployment tool 200. In general, the assessment tools may be used to access and evaluate existing component and network configurations (e.g., "as built"), but may also allow for altering, updating, upgrading, or otherwise changing the existing components and network. The design tools may allow for initial setup or addition to networks, such as for design and layout of the network architecture (or architectures of related networks), programming of network aspects of the components, configuration scripts for the components, and so forth.

As noted, the system will include user interfaces designed to allow interaction with users, operators, analysts, designers, and any other personnel. Access may be limited or controlled in any desired manner. The system will include and display a number of interface screens that allow for defining a network or part of a network, and the evaluation to be performed, as well as to input any known or relevant information, and to view reports or summaries of the resulting network evaluation (and particularly of the component and network configuration). The screens may be produced locally on an operator workstation, or remotely, and served to the operator workstation, depending upon the desired implementation.

Figure 7:
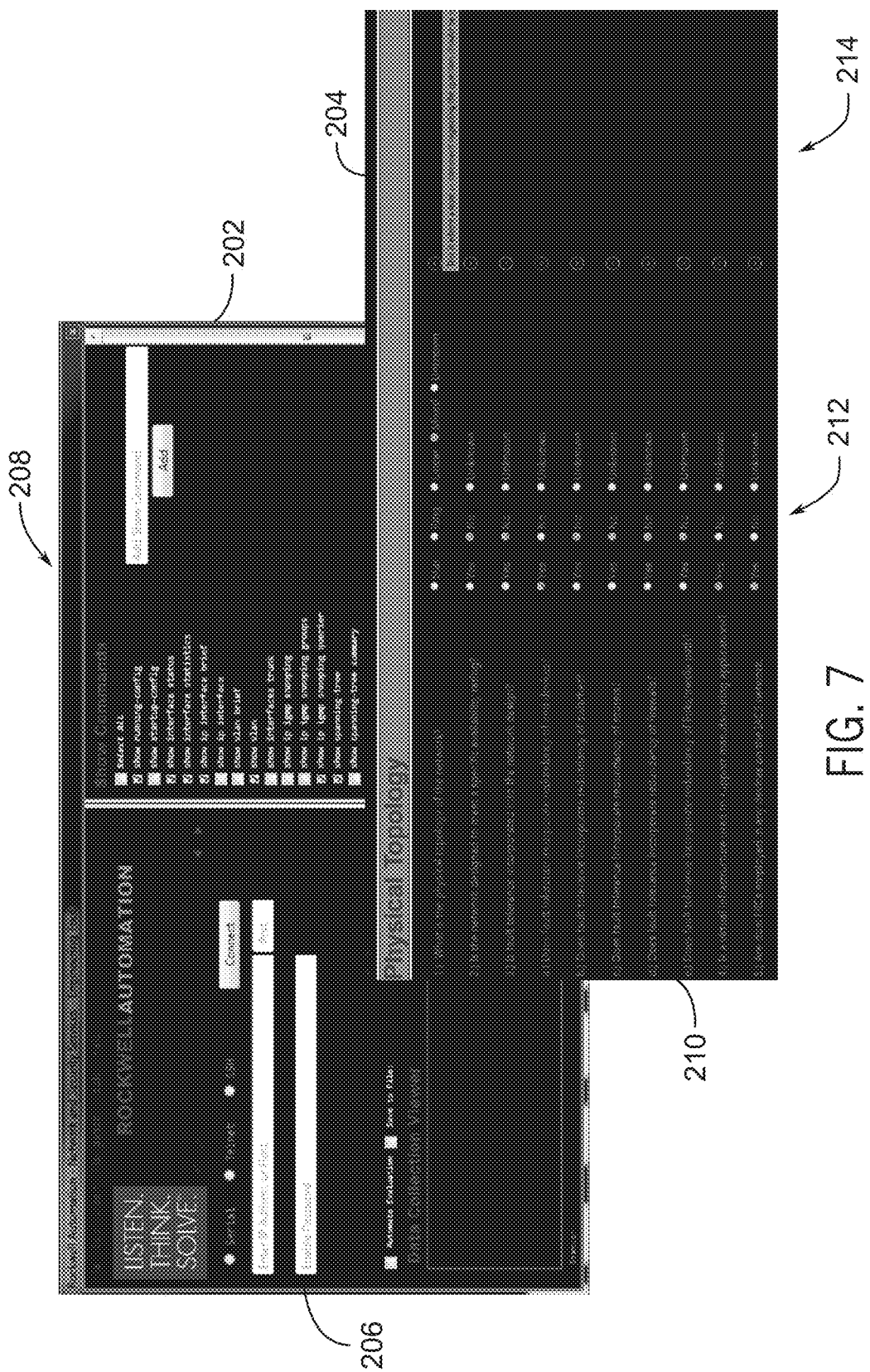
FIGS. 7 and 8 are example interface pages for the system.
Figure 8:
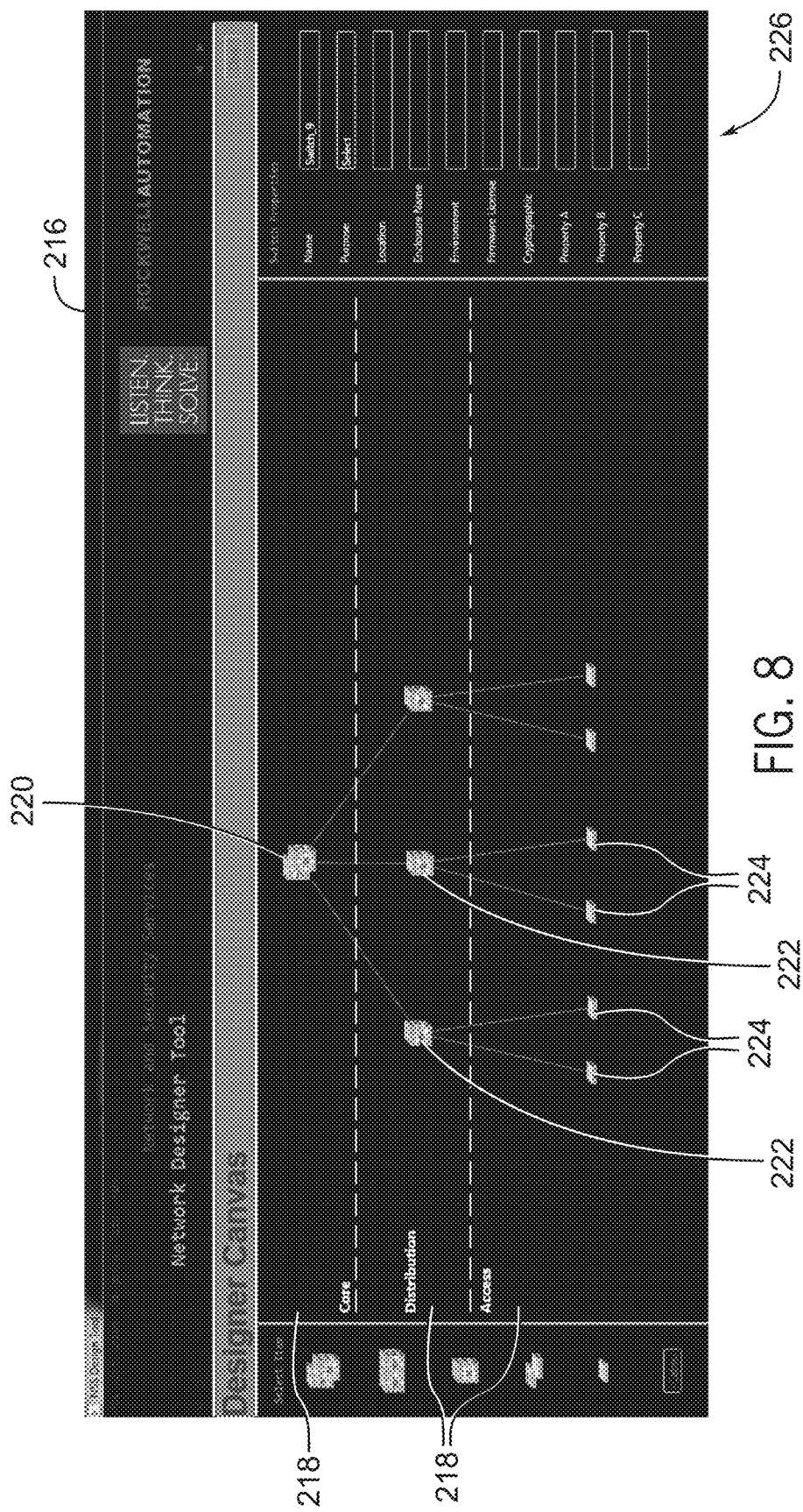

FIGS. 7 and 8 are example interface pages for the system. In the illustration of FIG. 7, an interface screen 202 includes fields 206 that allow a user to designate a network and to characterize it for a study. A suite of commands 208 may be displayed that allow the user to select operations to be performed in the evaluation. Each of these may correspond to a programmed routine stored in the system, and that can be instantiated and executed to access and test the industrial automation and network devices. A further screen 204 may be displayed, such as to allow for a query or survey of any known information about the network to be evaluated, as indicated at reference numeral 210. In this embodiment, selections 212 are available to the user, and comments may be made or observations preserved as indicated by reference 214. It should be noted that these are only examples of interface pages, and many others can be developed and used. In some cases, much will be known in advance about the automation application and its network, and some of this may be gleaned from existing network documentation (and input in either automated or manual operations). In other cases, little may be known, and the task of evaluation may include more discovery of components present and their interconnection and configuration.

FIG. 8 shows an example template for reporting a discovered configuration following access and evaluation. This template or report screen 216 is designed to provide a graphical illustration of the network components and their interconnection and configuration. As noted above, such networks may comprise multiple levels, and these may be reflected as indicated by reference 218. At each level, components 220, 222, and 224 may be shown by icons joined by known or detected connections. In some cases, these icons may resemble the physical components. Moreover, in some embodiments, these may be selectable to access and display more detailed information regarding the component and its configuration. In the illustrated example, the display also includes a list of properties 226, such as the name of the component, its purpose in the system, its location, and so forth.

Figure 9:
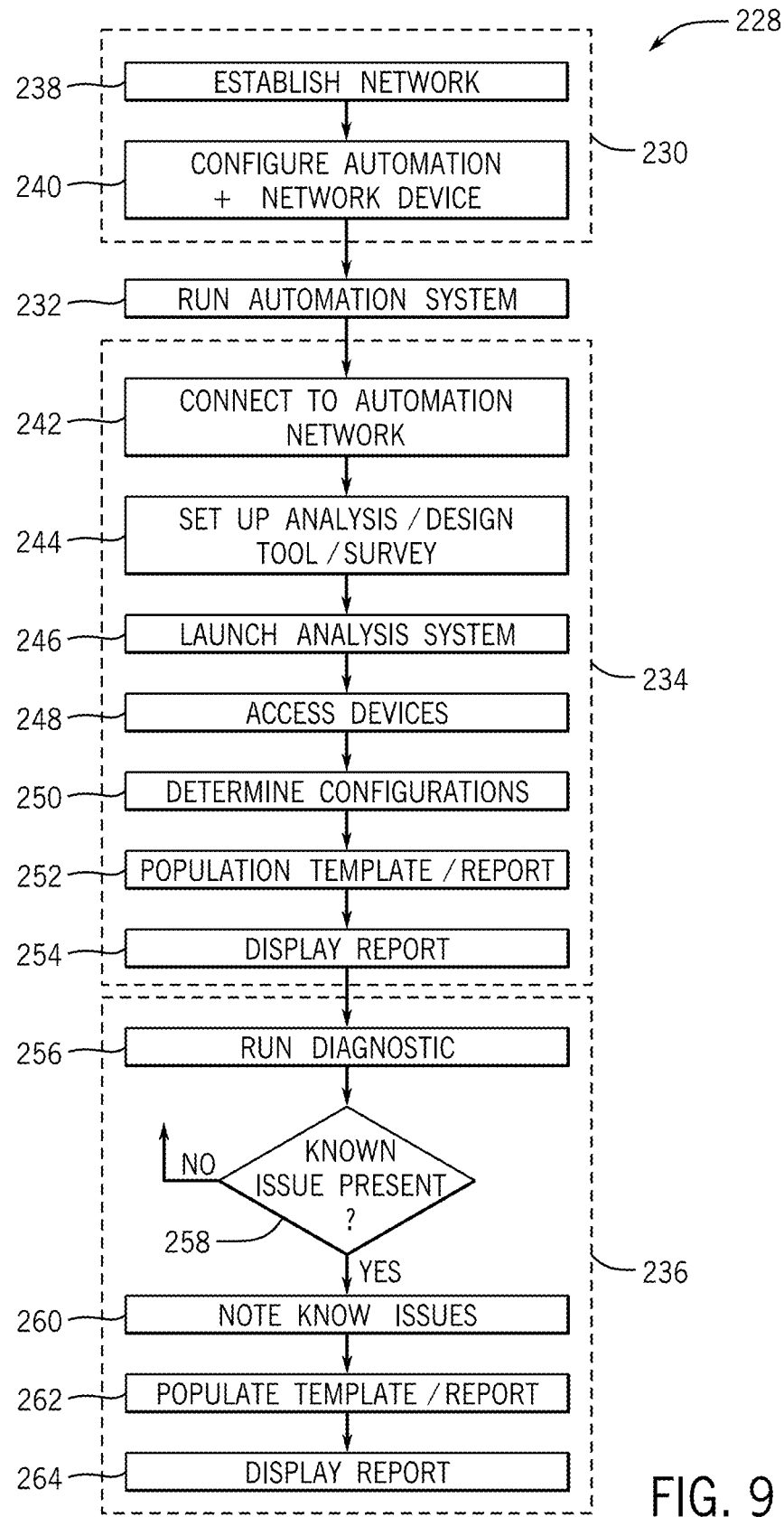
FIG. 9 is a flow chart illustrating example logic for accessing and evaluating an industrial automation network.

FIG. 9 is a flow chart illustrating example logic 228 for accessing and evaluating an industrial automation network. The operations illustrated may be grouped as a setup, configuration, and commissioning phase 230, followed by operation of the automation system 232 based upon the setup. A network evaluation phase 234 makes use of the system described above, and as part of this phase, or separately, a network diagnostics phase 236 may be performed. In the initial phase, the components may be selected, installed, and interconnected, as indicated at operation 238. Thereafter, the components may be configured, including for networking and data communication, as indicated at operation 240. The "normal operation" of the automation system then follows as indicated by block 232, which may include performing some or all of the automation functions required (e.g., manufacturing, material handling, process control, monitoring, closed and open loop control, and so forth).

In phase 234, the system or "tools" described above are executed. The system first connects to the network at operation 242, and the evaluation desired is set up, as indicated at 244. This may include executing the evaluation routines, serving any input or interface screens for the operator or analyst, and inputting of any desired (e.g., known) information about the components or network. Thereafter, the analysis system is launched for the evaluation (assessment) as indicated at 246. In this process, the devices on the network are accessed at operation 248, and to the extent possible, information (configuration data) is collected from each of them, including, for example, its identification, its purpose, its manufacturer and related data (e.g., model, serial number, version, etc.), its communications settings, and so forth. This information may, collectively, permit determination of network topologies and architectures, such as those discussed above. Once these configurations are determined, as indicated by reference 250. The data collected may be processed, such as to classify or otherwise categorize the components (e.g., by their role in the network), and the resulting data may be stored. At operation 252, then, the system may use the data to populate one or more templates to generate reports. These may be saved and displayed as indicated at operation 254. As noted above, such templates and reports may include textual and graphic information on the network, including "mapping" of the network topologies.

Where desired, a diagnostic phase 236 may be performed, and in practice, this may be partially or fully included in the evaluation phase. For example, as indicated at reference 256, diagnostics may be run on all or part of the network or its components. These may include tests for performance, data transmission, and other aspects of the component operation. The routines implemented may be based upon known possible issues with the network or particular components. It should be noted that, as additional tests available or other issues become known, these diagnostic tests may be expanded, updated, or replaced (and re-run). At block 258, the system determines whether a known issue is detected, and if so, it is noted and data relating to the event (e.g., error) is stored. Based upon the results, then, one or more templates may be populated for reporting, as indicated at 260, and the report may be stored and displayed, as indicated at 264.

Of particular interest in the processing summarized in FIG. 9 is automatic parsing and analysis of the configuration data collected, and the automatic compilation of the reports. For example, such automated operations may include prompts to show neighbors in the network, as this information may be used in mapping the network topology. The system may similarly detect what components are active and functional, which components or connections are blocked. Moreover, errors, collisions, traffic flow, and so forth may be detected (and traced to a particular switch, for example). Data relating to versions of software, updates, and so forth of the components may be accessed and noted. Where possible root causes of detected issues may be determined.

In some embodiments, the network evaluation processes may be based upon telnet or serial connections, including, where desired, password protection or encrypted protocols. One or more libraries of protocols may be called upon (and stored in the system) to permit connections, particularly to manages switches, such as TCP libraries and protocols to allow TCP clients to connect to the switches to send commands and to receive data in response to the commands. If other authentication protocols are used (e.g., multi-factor protocols), these may use authorization and tokens, which may require updating. Moreover, the system may upload or import text files, such as for sorting.

As part of the evaluation, diagnostics (or design), the system may also store or access documentation for some or all of the components. These may define limited variable sets and design tools may allow for greatly facilitating network design (or altering or improving existing networks), including configuration of locations, enclosures, location or enclosure names, redundancy, switch types (e.g., core, redundant, distribution, access, etc.), cable type, etc.

Finally, it should be noted that the system contemplated will not only query and determine configuration of the components individually, but will discover relationships between the devices. Owing to the automated nature of the operations, personnel defining and executing the evaluations may be less skilled, and more skilled analysts called upon at later stages (e.g., analysis of reports and errors or issued discovered). The resulting system is far more efficient and requires a fraction of the time required for manual analysis of the industrial automation network.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
an industrial automation network hardware interface that, in operation, establishes connections with industrial automation machines connected over an industrial automation network;
an evaluation module comprising executable code stored in an evaluation hardware module that, in cooperation, determines configuration of the industrial automation machines and the industrial automation network automatically and without user interaction; and
a user interface that, in operation, presents the configuration graphically to a user;
wherein the industrial automation machines comprise a managed switch that controls data traffic, what components and users have access to data, and prioritization of data for control and monitoring operations of the industrial automation machines.

2. The system of claim 1, wherein the industrial automation network hardware interface is configured to establish the connections with industrial automation machines connected over an industrial automation network while the industrial automation machines are controlling an industrial automation process.

3. The system of claim 1, wherein the evaluation module is configured to execute the code stored in an evaluation hardware module to determine configuration of the industrial automation machines and the industrial automation network while the industrial automation machines are controlling an industrial automation process.

4. The system of claim 1, wherein the evaluation module is configured to compare the determined configuration of the industrial automation machines and the industrial automation network to a known set of deficiencies.

5. The system of claim 4, wherein the evaluation module is configured to permit updating of the known set of deficiencies, and upon updating determines an expanded or altered set of deficiencies in the determined configuration.

6. The system of claim 1, wherein the user interface is configured to permit user input of data descriptive of the industrial automation machines and the industrial automation network.

7. The system of claim 1, wherein the user interface displays a graphical summary of the industrial automation machines and the industrial automation network indicative of levels of interconnection.

8. The system of claim 1, comprising a design module comprising executable code stored in a design hardware module that, in cooperation, configures or changes configuration of the industrial automation machines and the industrial automation network.

9. The system of claim 1, wherein the evaluation module comprises a standard template indicative of the determined configuration, and wherein, in operation, the evaluation module populates the template with data indicative of the determined configuration and any detected deficiencies automatically and without operator intervention.

10. The system of claim 1, wherein the industrial managed switch provides communication between components of a ring and other networks beyond the ring.

11. A system comprising:
an industrial automation network hardware interface that, in operation, establishes connections with industrial automation machines connected over an industrial automation network;
an evaluation module comprising executable code stored in an evaluation hardware module that, in cooperation, determines configuration of the industrial automation machines and the industrial automation network automatically and without user interaction; and
a user interface that, in operation, presents the configuration graphically to a user;
wherein the industrial automation network comprises a plurality of industrial managed switches and a plurality of network levels; and
wherein the evaluation module and the user interface cooperate to determine configuration of the industrial managed switches and to identify and display representations of the networked industrial automation machines at the plurality of network levels;
wherein the managed switches control data traffic, what components and users have access to data, and prioritization of data for control and monitoring operations of the industrial automation machines.

12. The system of claim 11, wherein the industrial automation network hardware interface is configured to establish the connections with industrial automation machines connected over an industrial automation network while the industrial automation machines are controlling an industrial automation process.

13. The system of claim 11, wherein the evaluation module is configured to compare the determined configuration of the industrial automation machines and the industrial automation network to a known set of deficiencies.

14. The system of claim 13, wherein the evaluation module is configured to permit updating of the known set of deficiencies, and upon updating determines an expanded or altered set of deficiencies in the determined configuration.

15. The system of claim 11, wherein the evaluation module comprises a standard template indicative of the determined configuration, and wherein, in operation, the evaluation module populates the template with data indicative of the determined configuration and any detected deficiencies automatically and without operator intervention.

16. A method comprising:
establishing, via an industrial automation network hardware interface, connections with industrial automation machines connected over an industrial automation network;
evaluating, via an evaluation module comprising executable code stored in an evaluation hardware module, configuration of the industrial automation machines and the industrial automation network automatically and without user interaction; and
configuring and graphically displaying to a user the configuration, via a user interface;
wherein the industrial automation machines comprise a managed switch that controls data traffic, what components and users have access to data, and prioritization of data for control and monitoring operations of the industrial automation machines.

17. The method of claim 16, wherein the industrial automation network comprises a plurality of industrial managed switches and a plurality of network levels, and wherein the evaluation module and the user interface cooperate to determine configuration of the industrial managed switches and to identify and display representations of the networked industrial automation machines at the plurality of network levels.

18. The method of claim 16, wherein the industrial automation network hardware interface is configured to establish the connections with industrial automation machines connected over an industrial automation network while the industrial automation machines are controlling an industrial automation process.

19. The method of claim 16, wherein the evaluation module is configured to execute the code stored in an evaluation hardware module to determine configuration of the industrial automation machines and the industrial automation network while the industrial automation machines are controlling an industrial automation process.

20. The method of claim 1, wherein the evaluation module is configured to compare the determined configuration of the industrial automation machines and the industrial automation network to a known set of deficiencies, and wherein the evaluation module is configured to permit updating of the known set of deficiencies, and upon updating determines an expanded or altered set of deficiencies in the determined configuration.

\* \* \* \* \*